United States Patent
Lee et al.

(10) Patent No.: US 11,704,827 B2
(45) Date of Patent: Jul. 18, 2023

(54) ELECTRONIC APPARATUS AND METHOD FOR ASSISTING WITH DRIVING OF VEHICLE

(71) Applicant: SAMSUNG ELECTRONICS CO., LTD., Suwon-si (KR)

(72) Inventors: Kibeom Lee, Suwon-si (KR); Gyu-tae Park, Suwon-si (KR); Boseok Moon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 583 days.

(21) Appl. No.: 16/832,426

(22) Filed: Mar. 27, 2020

(65) Prior Publication Data

US 2020/0310459 A1    Oct. 1, 2020

(30) Foreign Application Priority Data

Mar. 29, 2019    (KR) .................. 10-2019-0037312

(51) Int. Cl.
*G06V 20/58*    (2022.01)
*G06T 7/73*    (2017.01)
(Continued)

(52) U.S. Cl.
CPC .............. *G06T 7/73* (2017.01); *G05D 1/0212* (2013.01); *G05D 1/0251* (2013.01); *G06T 7/70* (2017.01);
(Continued)

(58) Field of Classification Search
CPC .............. G05D 1/0251; G05D 1/0212; G05D 2201/0212; G05D 2201/0213; G06T 7/70; G06T 2207/30252; G09F 21/048
See application file for complete search history.

(56) References Cited

U.S. PATENT DOCUMENTS 8,856,541 B1    10/2014    Chaudhury et al.
9,944,317 B2    4/2018    Lee
(Continued)

FOREIGN PATENT DOCUMENTS

JP          6271068 B1        1/2018
KR    10-2016-0136932 A    11/2016
KR    10-2018-0035851 A     4/2018

OTHER PUBLICATIONS

Geronimo D et al. "2D-3D-based on-board pedestrian detection system", vol. 114, No. 5, May 1, 2010, XP 027017547, pp. 583-595 (13 pages total).

(Continued)

*Primary Examiner* — Kenneth J Malkowski
(74) *Attorney, Agent, or Firm* — Sughrue Mion, PLLC

(57) ABSTRACT

An electronic apparatus and method for assisting with driving of a vehicle are provided. The electronic apparatus includes: a processor configured to execute one or more instructions stored in a memory, to: obtain a surrounding image of the vehicle via at least one sensor, recognize an object from the obtained surrounding image, obtain three-dimensional (3D) coordinate information for the object by using the at least one sensor, determine a number of planar regions constituting the object, based on the 3D coordinate information corresponding to the object, determine whether the object is a real object, based on the number of planar regions constituting the object, and control a driving operation of the vehicle based on a result of the determining whether the object is the real object.

11 Claims, 19 Drawing Sheets

(51) Int. Cl.
  *G05D 1/02* (2020.01)
  *G06T 7/70* (2017.01)
  *G06V 10/70* (2022.01)
  *G06V 10/82* (2022.01)

(52) U.S. Cl.
  CPC ............ *G06V 10/768* (2022.01); *G06V 10/82* (2022.01); *G06V 20/58* (2022.01); *G05D 2201/0212* (2013.01); *G05D 2201/0213* (2013.01); *G06T 2207/30252* (2013.01)

(56) References Cited

U.S. PATENT DOCUMENTS

| | | | |
|---|---|---|---|
| 10,685,447 B2 | 6/2020 | Sergeev | |
| 2007/0127778 A1* | 6/2007 | Fujimoto | G06V 20/588 382/104 |
| 2011/0248880 A1* | 10/2011 | Miyahara | G01S 7/4802 342/54 |
| 2015/0210312 A1* | 7/2015 | Stein | B62D 6/00 701/41 |
| 2015/0379371 A1* | 12/2015 | Yoon | G06K 9/6289 382/103 |
| 2018/0260613 A1 | 9/2018 | Gao | |
| 2020/0079367 A1 | 3/2020 | Fujimoto | |

OTHER PUBLICATIONS

Extended European Search Report dated Feb. 14, 2022 by European Patent Office in International Application No. 20782474.9.
"Random sample consensus" Wikipedia, Mar. 3, 2020, retrieved from [https://en.wikipedia.org/wiki/Random_sample_consensus], (10 pages total).
Michael Ying Yang et al. "Plane Detection in Point Cloud Data" Technical Report, Nr. 1, 2010, (16 pages total).
International Search Report and Written Opinion (PCT/ISA/210 and PCT/ISA/237), dated Jul. 2, 2020 by International Searching Authority in International Application No. PCT/KR2020/004235.

* cited by examiner

ELECTRONIC APPARATUS AND METHOD FOR ASSISTING WITH DRIVING OF VEHICLE

CROSS-REFERENCE TO RELATED APPLICATION(S)

This application is based on and claims priority under 35 U.S.C. § 119 to Korean Patent Application No. 10-2019-0037312, filed on Mar. 29, 2019, in the Korean Intellectual Property Office, the disclosure of which is incorporated by reference herein in its entirety.

BACKGROUND

1. Field

The disclosure relates to an electronic apparatus and an operation method thereof, and more particularly, to an electronic apparatus and method for assisting with driving of a vehicle.

2. Description of Related Art

Along with the merging of information communication technology and the vehicle industry, smartification of vehicles has been rapidly progressing. According to such smartification, vehicles have evolved from simple mechanical devices to smart cars. In particular, autonomous driving has received attention as a core technique of a smart car.

Autonomous driving refers a technique of autonomously arriving at a destination without a driver's operation of a steering wheel, an acceleration pedal, a brake, or the like.

Recently, various additional functions related to autonomous driving have been developed, and research into a method capable of providing a safe autonomous driving experience to a passenger by controlling a vehicle through recognition and determination of a driving environment using various kinds of data has been demanded.

SUMMARY

Provided are an electronic apparatus and a method for assisting with driving of a vehicle.

Additional aspects will be set forth in part in the description which follows and, in part, will be apparent from the description, or may be learned by practice of the presented embodiments.

In accordance with an aspect of the disclosure, an electronic apparatus for assisting with driving of a vehicle, includes: a sensor; a memory storing one or more instructions; and a processor configured to execute the one or more instructions stored in the memory to: obtain a surrounding image of the vehicle via the sensor, determine an object from the obtained surrounding image, obtain three-dimensional (3D) coordinate information for the determined object, determine a number of planar regions constituting the object, based on the 3D coordinate information corresponding to the object, determine whether the object is a real object, based on the determined number of planar regions constituting the object, and control a driving operation of the vehicle based on a result of the determining whether the object is the real object.

The processor may be further configured to execute the one or more instructions to determine that the object is not the real object based on the determined number of planar regions constituting the object being one.

The processor may be further configured to execute the one or more instructions to, based on the object determined to not be the real object: determine, as a masking region, the object in the surrounding image; and transmit information about the masking region to one or more modules configured to control the driving operation of the vehicle.

The processor may be further configured to execute the one or more instructions to, based on the determined number of planar regions constituting the object being one, determine whether the object is an image included in another object.

The processor may be further configured to execute the one or more instructions to, based on the determined number of planar regions constituting the object being one, determine whether the object is the image included in the other object, according to a comparison between the 3D coordinate information corresponding to the object and 3D coordinate information corresponding to the other object determined to be a real object.

In accordance with another aspect of the disclosure, an electronic apparatus for assisting with driving of a vehicle, includes: a sensor; a memory storing one or more instructions; and a processor configured to execute the one or more instructions stored in the memory to: obtain a surrounding image of the vehicle via the sensor, detect an object including a region determined as a road from the obtained surrounding image, obtain three-dimensional (3D) coordinate information corresponding to the object, determine a number of planar regions constituting the object, based on the 3D coordinate information corresponding to the object, based on the determined number of planar regions constituting the object being one, determine whether the object is a real road according to a gradient of a planar region constituting the object, and control a driving operation of the vehicle based on a result of the determining whether the object is the real road.

The processor may be further configured to execute the one or more instructions to: determine a separation distance between the object and a ground on which the vehicle is driving, based on the 3D coordinate information corresponding to the object; and determine whether the object is the real road, based on the separation distance.

The processor may be further configured to execute the one or more instructions to, based on the object determined to not be the real road: determine, as a masking region, the object in the surrounding image; and transmit information about the masking region to one or more modules configured to control the driving operation of the vehicle.

The processor may be further configured to execute the one or more instructions to, based on the determined number of planar regions constituting the object being one: determine the gradient of the planar region of the object; and determine that the object is not the real road based on determining that the gradient of the planar region of the object differs by at least a predetermined threshold from a gradient of a ground in a driving direction of the vehicle.

In accordance with another aspect of the disclosure, a method of assisting with driving of a vehicle, includes: obtaining a surrounding image of the vehicle; determining an object from the obtained surrounding image; obtaining three-dimensional (3D) coordinate information for the determined object; determining a number of planar regions constituting the object, based on the 3D coordinate information corresponding to the object; determining whether the object is a real object, based on the determined number of planar regions constituting the object; and controlling a driving operation of the vehicle based on a result of the determining whether the object is the real object.

The determining of whether the object is the real object may include determining that the object is not the real object based on the determined number of planar regions constituting the object being one.

The controlling of the driving operation of the vehicle may include, based on the object determined to not be the real object: determining, as a masking region, the object in the surrounding image; and transmitting information about the masking region to one or more modules configured to control the driving operation of the vehicle.

The method may further include, based on the determined number of planar regions constituting the object being one, determining whether the object is an image included in another object.

The method may further include, based on the determined number of planar regions constituting the object being one, determining whether the object is the image included in the other object, according to a comparison between the 3D coordinate information corresponding the object and 3D coordinate information corresponding to the other object determined to be a real object.

In accordance with another aspect of the disclosure, a method of assisting with driving of a vehicle, includes: obtaining a surrounding image of the vehicle; detecting an object including a region determined as a road from the obtained surrounding image; obtaining three-dimensional (3D) coordinate information corresponding to the object; determining a number of planar regions constituting the object, based on the 3D coordinate information corresponding to the object; based on the determined number of planar regions constituting the object being one, determining whether the object is a real road according to a gradient of a planar region constituting the object; and controlling a driving operation of the vehicle based on a result of the determining whether the object is the real road.

The determining of whether the object is the real road may include: determining a separation distance between the object and a ground on which the vehicle is driving, based on the 3D coordinate information corresponding to the object; and determining whether the object is the real road, based on the separation distance.

The controlling of the driving operation of the vehicle may include, based on the object determined to not be the real road: determining, as a masking region, the object in the surrounding image; and transmitting information about the masking region to one or more modules configured to control the driving operation of the vehicle.

The determining whether the object is the real road may include, based on the determined number of planar regions constituting the object being one: determining the gradient of the planar region of the object; and determining that the object is not the real road based on determining that the gradient of the planar region of the object differs by at least a predetermined threshold from a gradient of a ground in a driving direction of the vehicle.

In accordance with another aspect of the disclosure, a non-transitory computer-readable recording medium has recorded thereon a program for executing at least one of the methods of assisting with driving of a vehicle.

In accordance with another aspect of the disclosure, an electronic apparatus for assisting with driving of a vehicle, includes: a memory storing one or more instructions; and a processor configured to execute the one or more instructions stored in the memory to: obtain a surrounding image of the vehicle, determine an object from the obtained surrounding image, determine a number of planar regions constituting the object, determine whether the object is a real object, based on the determined number of planar regions constituting the object, and control a driving operation of the vehicle based on a result of the determining whether the object is the real object.

The processor may be further configured to execute the one or more instructions to determine that the object is not the real object based on the determined number of planar regions constituting the object being one.

The processor may be further configured to execute the one or more instructions to, based on the object determined to not be the real object: determine, as a masking region, the object in the surrounding image; and transmit information about the masking region to one or more modules configured to control the driving operation of the vehicle.

The processor may be further configured to execute the one or more instructions to, based on the determined number of planar regions constituting the object being one, determine whether the object is an image included in another object.

The processor may be further configured to execute the one or more instructions to, based on the determined number of planar regions constituting the object being one, determine whether the object is a real road according to at least one of: a gradient of a planar region constituting the object; and a separation distance between the object and a ground on which the vehicle is driving.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The terms used in the detailed description may be general terms currently widely used in the art, but may also vary according to the intention of those of ordinary skill in the art, precedents, or new technology in the art. Also, specified terms may be selected by the applicant and may be defined in detail in the detailed description. Thus, the terms used in the specification should be understood not as simple names but based on the meaning of the terms and the overall description.

Throughout the specification, it will also be understood that when a component "includes" an element, unless explicitly stated otherwise, it should be understood that the component does not exclude another element but may further include another element. In addition, terms such as " . . . unit", " . . . module", and the like refer to units that perform at least one function or operation, and the units may be implemented as hardware or software or as a combination of hardware and software.

Hereinafter, embodiments of the disclosure will be described in detail with reference to the accompanying drawings so that those of ordinary skill in the art may easily realize the disclosure. However, the disclosure may be embodied in many different forms and should not be construed as being limited to embodiments set forth herein.

Throughout the disclosure, expressions such as "at least one of a, b and c" indicates only a, only b, only c, both a and b, both a and c, both b and c, all of a, b, and c, or variations thereof.

Figure 1:
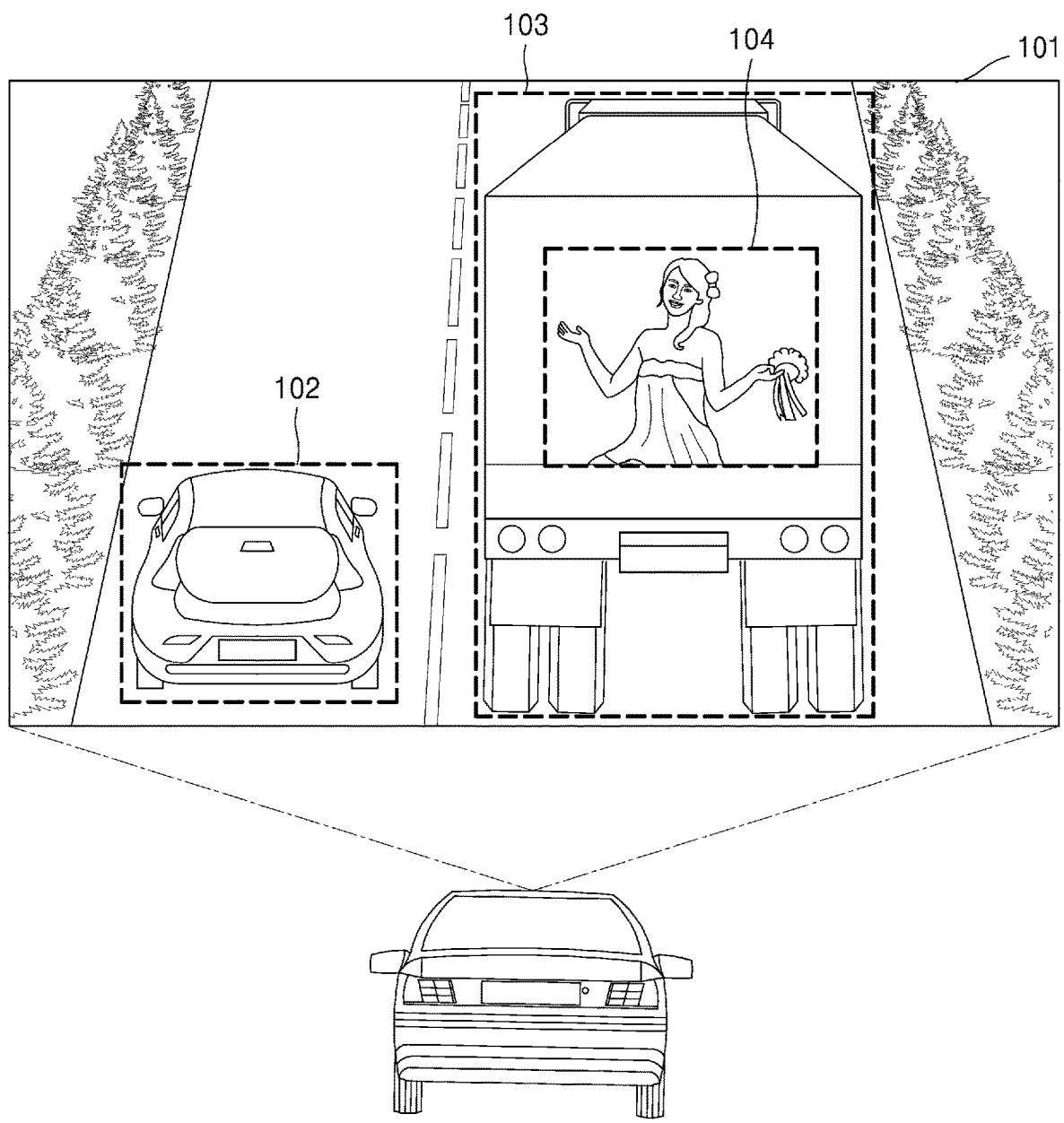
FIG. 1 illustrates an example of operating an electronic apparatus for assisting with driving of a vehicle, according to an embodiment.

FIG. 1 illustrates an example of operating an electronic apparatus 100 for assisting with driving of a vehicle 1, according to an embodiment.

In the specification, a vehicle 1 (see FIG. 19) (hereinafter, the vehicle 1 or autonomous vehicle 1) may include an electronic apparatus 100 (see FIGS. 17 and 18) (hereinafter, the electronic apparatus 100) for assisting with or controlling driving of the vehicle 1. According to an embodiment, the electronic apparatus 100 may be mounted on the vehicle 1 and operate such that the vehicle 1 may autonomously drive or autonomously control a portion of a driving operation. For example, the vehicle 1 may be implemented to perform an autonomous driving system or advanced driver assistance systems (ADAS) function.

A vehicle capable of autonomously driving or autonomously controlling at least some functions may recognize an object around the vehicle by using various sensors while the vehicle is driving, thereby providing a safe driving environment.

According to an embodiment, the object indicates an object sensed from the surroundings (front, rear, side directions, and the like) of the vehicle while the vehicle is driving.

The object may, for example, include a pedestrian, another vehicle, an obstacle on a traveling path, and the like, but is not limited thereto.

According to an embodiment, the electronic apparatus 100 mounted on the vehicle 1 may identify, for each object recognized from the surroundings of the vehicle 1, a bounding box and control a driving operation of the vehicle 1 by considering objects identified as bounding boxes.

According to an embodiment, the electronic apparatus 100 may generate one bounding box so as to include at least a portion of a recognized object, for each recognized object.

For example, a bounding box may be generated in a quadrangular form capable of tightly (e.g., most tightly) including a recognized object. In this case, an aspect ratio of the quadrangular form is not predetermined, and the bounding box may be generated to include all the edges of the object. Alternatively, for example, a bounding box may be generated in a certain ratio of quadrangular form while including a maximum or minimum length of width of a recognized object, but is not limited thereto. According to an embodiment, the electronic apparatus 100 may preset or change criteria related to generation of a bounding box to be generated to encompass a recognized object.

Referring to FIG. 1, the electronic apparatus 100 may capture a surrounding image 101 by using an image sensor 228 (see FIG. 18) while the vehicle 1 is driving. The surrounding image according to an embodiment may be an image including a surrounding region of the vehicle 1. According to an embodiment, the electronic apparatus 100 may safely control a driving operation by recognizing objects around the vehicle 1, e.g., another moving vehicle, a person nearby, and the like, from the surrounding image 101 captured while the vehicle 1 is driving.

As shown in the example of FIG. 1, the electronic apparatus 100 may recognize one or more objects 102, 103, and 104 included in the surrounding image 101. According to an embodiment, the electronic apparatus 100 may generate respective bounding boxes for the recognized objects 102, 103, and 104 and control a driving operation of the vehicle 1 based on the generated bounding boxes. For example, the electronic apparatus 100 may recognize a first vehicle (e.g., a taxi) 102, a second vehicle (e.g., a truck) 103, and a person 104 from the surrounding image 101. The electronic apparatus 100 may generate respective bounding boxes for the recognized first vehicle (e.g., a taxi) 102, second vehicle (e.g., a truck) 103, and person 104 and control a driving operation of the vehicle 1 based on the generated bounding boxes.

Meanwhile, the person 104 included in the surrounding image 101 shown in FIG. 1 is an image displayed on a rear surface of the second vehicle 103. However, when the electronic apparatus 100 is aware of the person 104 recognized from the surrounding image 101 as a real person instead of the image displayed on the rear surface of the second vehicle 103, the electronic apparatus 100 may control a driving operation of the vehicle 1 in a direction in which the vehicle 1 avoids the person 104, thereby resulting in an incorrect driving operation.

For example, an advertisement or promotion image displayed on one surface of a vehicle, an image of another vehicle or the like appearing on one surface of an aluminum-coated vehicle due to a reflective effect, an image displayed on a screen provided to one surface of a vehicle, or the like is not an independent real object but merely an image displayed on another object. According to an embodiment, the electronic apparatus 100 may determine that an image, which is not a real or physically independent thing but is displayed on another object, is not a real thing.

According to the present embodiment, the electronic apparatus 100 may discriminate real objects from an image displayed on another real object among the objects 102, 103, and 104 recognized from the surrounding image 101. The electronic apparatus 100 may control accurate and safe driving by calculating how many planar regions constitute an object recognized from the surrounding image 101 and determining whether the object is a real thing based on the calculation result.

A planar region may indicate a corresponding region when one external surface of an object constitutes a plane on a three-dimensional (3D) coordinate system of X-, Y-, and Z-axes.

The electronic apparatus 100 may determine that a recognized object is not a real object but an image displayed on another object when it is calculated that the recognized object consists of one planar region. In the example of FIG. 1, the electronic apparatus 100 may determine that the person 104 recognized from the surrounding image 101 is merely an image displayed on another object 103.

More particular operations of the electronic apparatus 100 according to an embodiment are described in more detail with reference to the drawings below.

It is understood that the example of FIG. 1 shows one embodiment, and one or more other embodiments are not limited thereto.

Figure 2:
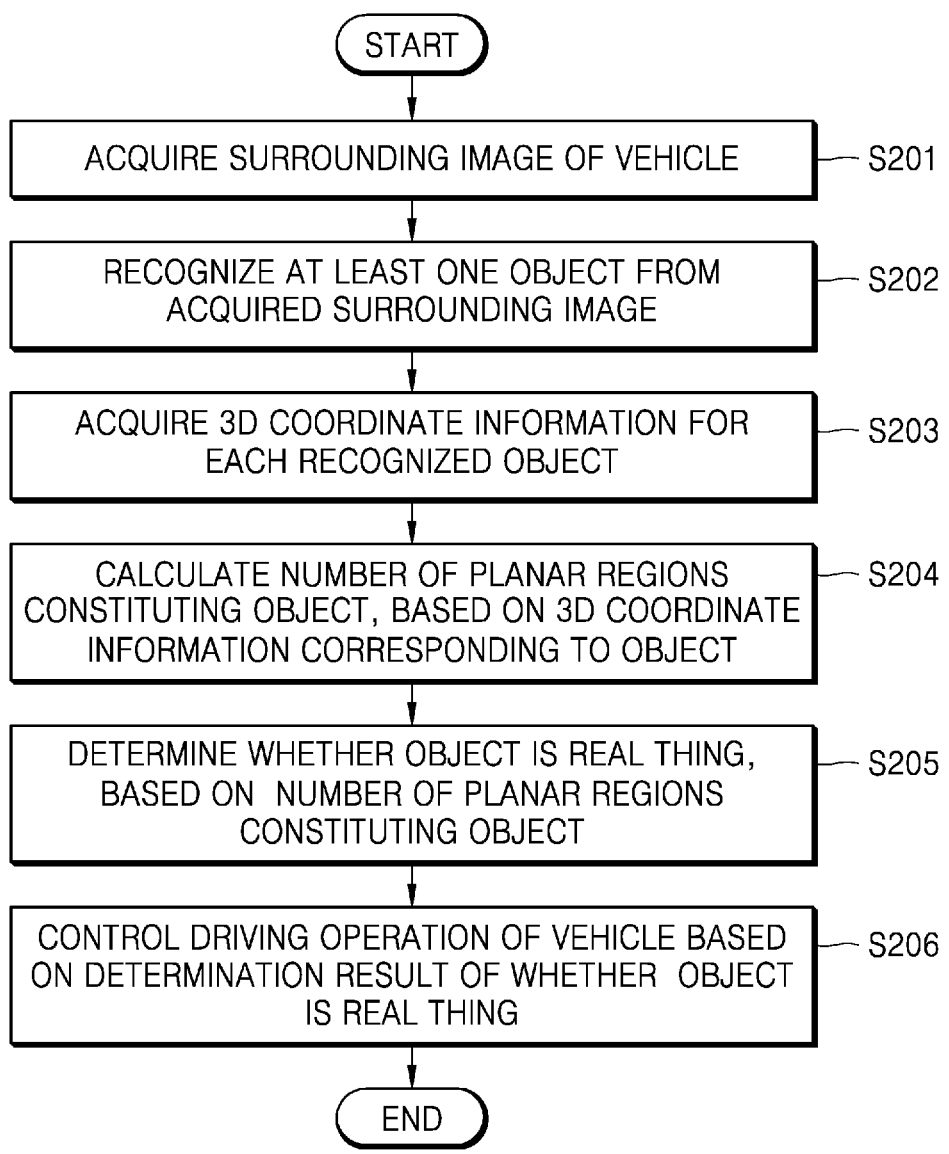
FIG. 2 is a flowchart of an operating method of an electronic apparatus, according to an embodiment.
Figure 3:
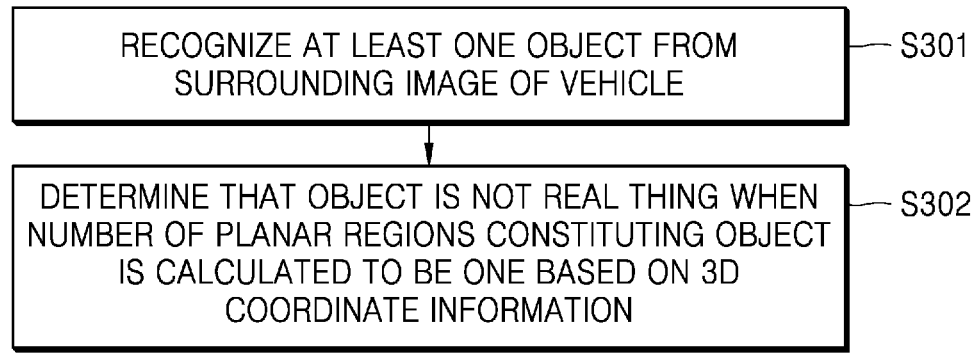
FIG. 3 is a flowchart of a method of determining whether an object is a real thing, according to an embodiment.
Figure 4:
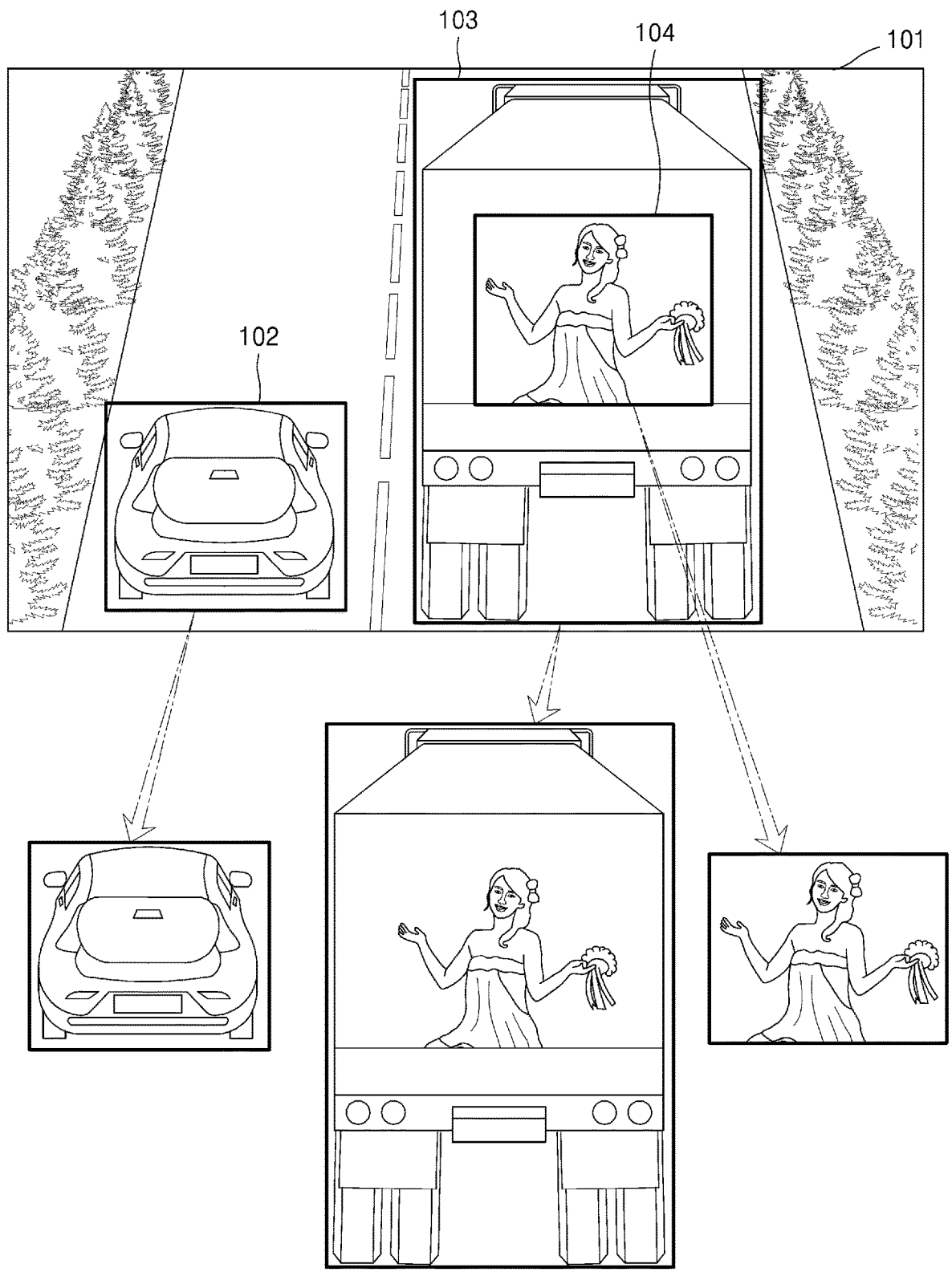
FIG. 4 illustrates an example of recognizing an object from an image, according to an embodiment.
Figure 5:
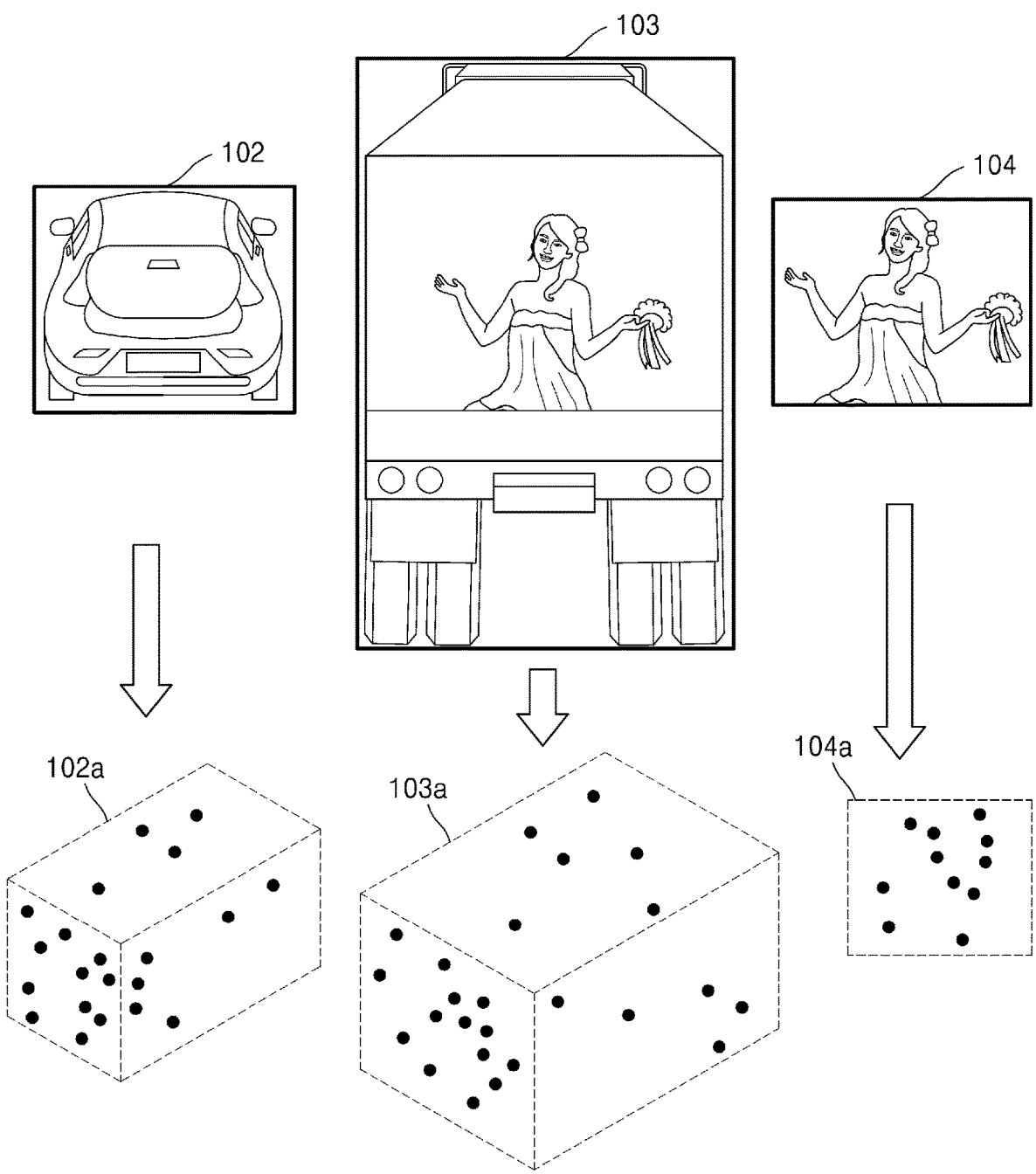
FIG. 5 illustrates an example of calculating a number of planar regions constituting an object, according to an embodiment.

FIG. 2 is a flowchart of an operating method of an electronic apparatus, according to an embodiment. FIG. 3 is a flowchart of a method of determining whether an object is a real thing (or real object), according to an embodiment. FIG. 4 illustrates an example of recognizing an object from an image, according to an embodiment. FIG. 5 illustrates an example of calculating a number of planar regions constituting an object, according to an embodiment. The flowcharts of FIGS. 2 and 3 will be described with reference to FIGS. 4 and 5.

Referring to FIG. 2, in operation S201, the electronic apparatus 100 may acquire a surrounding image of a vehicle.

The electronic apparatus 100 may capture a surrounding image by using the image sensor 228 (see FIG. 18) while the vehicle 1 is driving. For example, the electronic apparatus 100 may photograph the surroundings of the vehicle 1 based on a preset period and/or in response to a predetermined event.

The image sensor 228 (see FIG. 18) may include a still camera or a video camera configured to record an external environment of the vehicle 1. For example, the image sensor 228 may include a plurality of cameras, and the plurality of cameras may be arranged at a plurality of positions on the inside and the outside of the vehicle 1.

In operation S202, the electronic apparatus 100 may recognize at least one object from the acquired surrounding image.

Referring to FIG. 4, for example, the electronic apparatus 100 may recognize the first vehicle 102, the second vehicle 103, and the person 104 from the acquired surrounding image 101.

The electronic apparatus 100 may recognize objects from a captured image by using an object recognition technique of recognizing objects included in an image.

For example, the electronic apparatus 100 may use an artificial intelligence algorithm (or a machine learning model, neural network, etc.) trained to recognize objects from an image. The electronic apparatus 100 mounted on the vehicle 1 may photograph the surroundings by using the image sensor (including the plurality of cameras) 228 and perform object detection by using a deep learning-based trained data recognition model to recognize objects from a plurality of image frames obtained by photographing the surroundings of the vehicle 1.

According to an embodiment, the object detection may be image processing for detecting objects (e.g., a pedestrian on a road, a vehicle, and the like) included in an image frame.

The object detection may be or include image processing for extracting candidate regions in an image frame to detect objects in the image frame and estimating types and positions of the objects in the candidate regions by using a trained data recognition model. For example, the object detection may use a data recognition model based on a convolutional neural network (CNN) or the like.

The electronic apparatus 100 may recognize objects included in an image, from the image, by using a certain object recognition technique and is not limited to the examples described above.

Referring back to FIG. 2, in operation S203, the electronic apparatus 100 may acquire 3D coordinate information for each recognized object.

Figure 18:
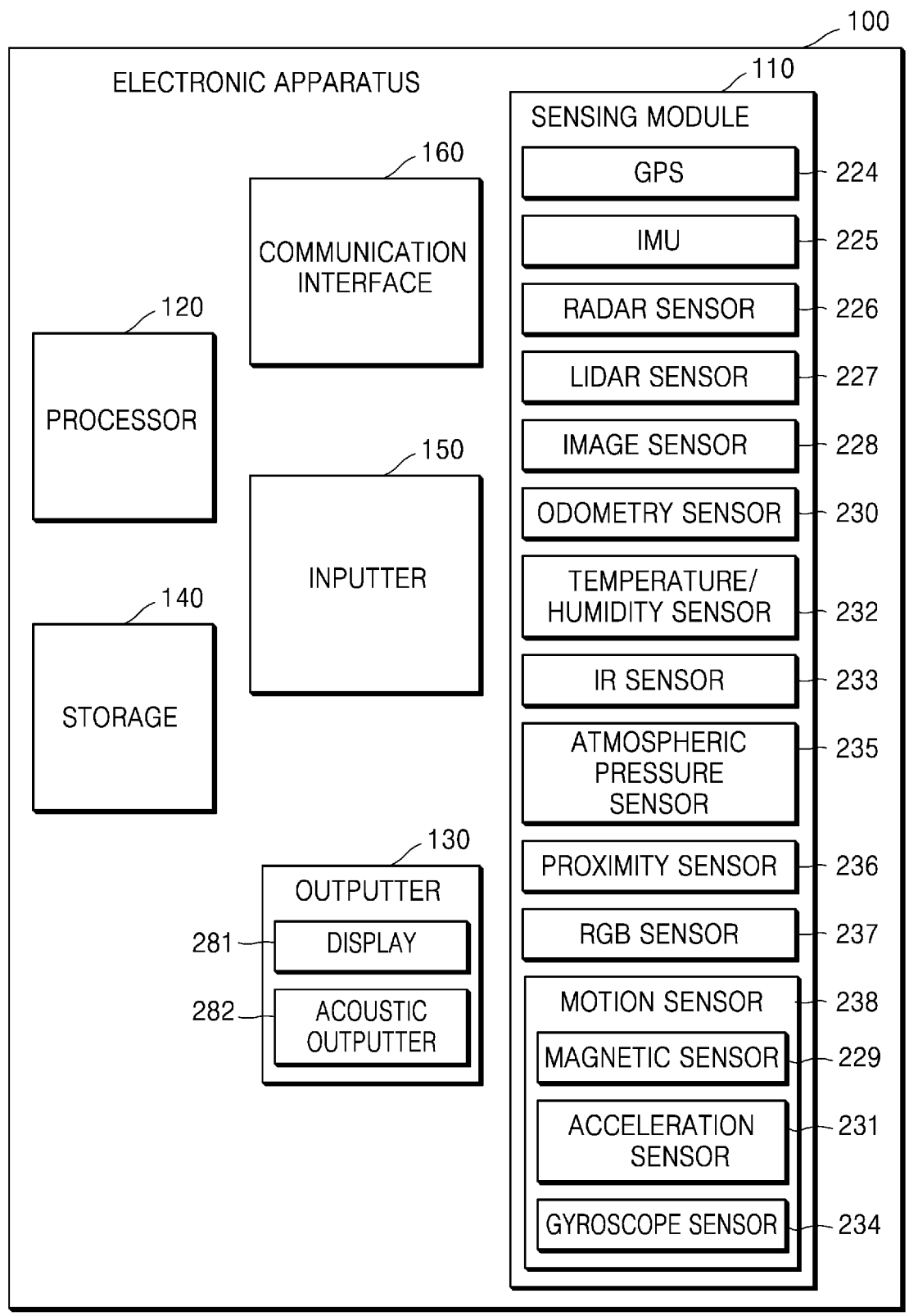
FIG. 18 is a detailed block diagram of the electronic apparatus according to an embodiment.

According to an embodiment of the disclosure, the 3D coordinate information may be acquired when the electronic apparatus 100 senses an object by using a sensing module 110 (see FIG. 18).

The 3D coordinate information may indicate data of a set of points indicating an external surface of an object on a 3D coordinate system of X-, Y-, and Z-axes. For example, the 3D coordinate information may include 3D PointCloud.

According to an embodiment, the electronic apparatus 100 may sense objects around the vehicle 1 by using the sensing module 110. For example, the electronic apparatus 100 may measure a plurality of points on the surface of an object by using a radio detection and ranging (RADAR) sensor 226 (see FIG. 18) and a light detection and ranging (LI DAR) sensor 227 (see FIG. 18).

The LIDAR sensor 227 (see FIG. 18) may sense a shape and a distance of a surrounding object, a terrain, and the like by outputting a laser beam using a laser output device and acquiring a reflected signal from the object through at least one laser receiver.

The RADAR sensor 226 (see FIG. 18) may be configured to sense objects in an environment where the vehicle 1 is located, by using a radio signal. In addition, the RADAR sensor 226 may be configured to sense speeds and/or directions of the objects.

Referring to FIG. 4, for example, the electronic apparatus 100 may acquire 3D coordinate information corresponding to each of objects (the first vehicle 102, the second vehicle 103, and the person 104) around the vehicle 1 by using the sensing module 110.

Referring back to FIG. 2, in operation S204, the electronic apparatus 100 may calculate a number of planar regions constituting an object based on 3D coordinate information corresponding to the object.

A planar region may indicate a corresponding region when one external surface of an object constitutes a plane on a 3D coordinate system of X-, Y-, and Z-axes.

Referring to FIG. 5, the electronic apparatus 100 may calculate or determine that the first vehicle 102 includes a plurality of planar regions 102a, based on 3D coordinate information corresponding to the first vehicle 102. In addition, the electronic apparatus 100 may calculate or determine that the second vehicle 103 includes a plurality of planar regions 103a, based on 3D coordinate information corresponding to the second vehicle 103. In addition, the electronic apparatus 100 may calculate or determine that the person 104 consists of one planar region 104*a*, based on 3D coordinate information corresponding to the recognized person 104.

Reference numerals 102*a* and 103*a* in FIG. 5 are shown for convenience of description to describe that the objects 102 and 103 include a plurality of planar regions, and it is understood that the disclosure is not limited thereto. In addition, reference numeral 104*a* in FIG. 5 is shown to describe that the object 104 consists of one planar region, and it is understood that the disclosure is not limited thereto.

According to an embodiment, the electronic apparatus 100 may calculate a number of planar regions constituting an object by using, for example, a RANdom SAmple Consensus (RANSAC) algorithm.

The RANSAC algorithm determines whether selected points constitute one plane while randomly selecting four or more points from a set of 3D points corresponding to each object. The electronic apparatus 100 may calculate how many planes constitute each object by using the RANSAC algorithm to repeat a process of determining whether randomly selected points constitute one plane.

Referring back to FIG. 2, in operation S205, the electronic apparatus 100 may determine whether the object is a real thing (e.g., determine whether the object is a real object, whether the object is not an image of an object, whether the object is not an image of an object on another object, etc.), based on the number of planar regions constituting the object.

Referring to FIG. 3, the electronic apparatus 100 may recognize at least one object from a surrounding image of the vehicle 1 in operation S301. In operation S302, the electronic apparatus 100 may determine that the object is not a real thing when the number of planar regions constituting the object is calculated or determine to be one based on 3D coordinate information corresponding to the object.

In the example shown in FIG. 5, the electronic apparatus 100 may determine that the person 104 is not a real thing, when (or based on) it is calculated or determine that the person 104 consists of one planar region 104*a*, based on 3D coordinate information corresponding to the recognized person 104.

In addition, in the example shown in FIG. 5, the electronic apparatus 100 may determine that the first vehicle 102 and the second vehicle 103 are real things, when it is calculated or determined that the first vehicle 102 and the second vehicle 103 consist of the plurality of planar regions 102*a* and 103*a*, respectively.

Referring back to FIG. 2, in operation S206, the electronic apparatus 100 may control a driving operation of the vehicle based on a result of the determining whether the object is a real thing.

In the example shown in FIG. 5, the electronic apparatus 100 may control a driving operation of the vehicle 1 based on the fact (or determination) that the recognized person 104 is not a real person (i.e., real object, real thing, etc.).

Accordingly, the electronic apparatus 100 may provide safe and accurate driving control by determining an object that is not a real thing from a surrounding image captured while the vehicle 1 is driving.

It is understood that FIGS. 2 to 5 are provided to describe an embodiment, and one or more other embodiments are not limited thereto.

Figure 6:
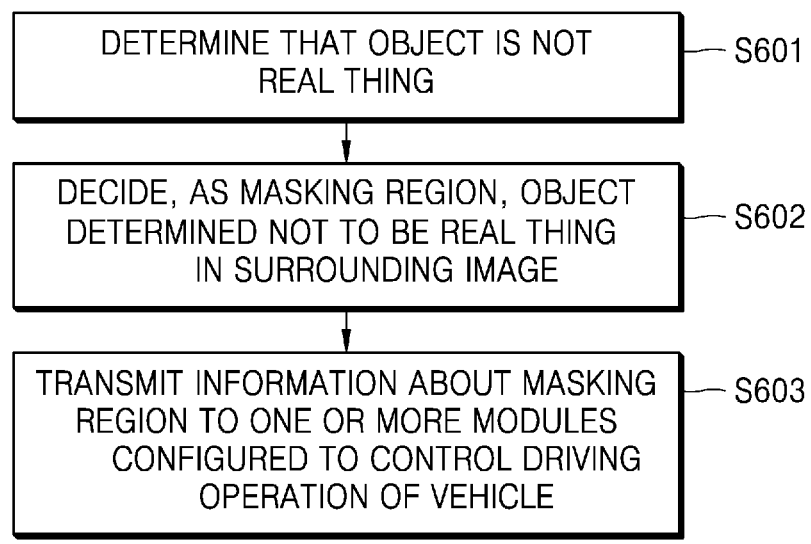
FIG. 6 is a flowchart of a method of deciding a masking region, according to an embodiment.
Figure 7:
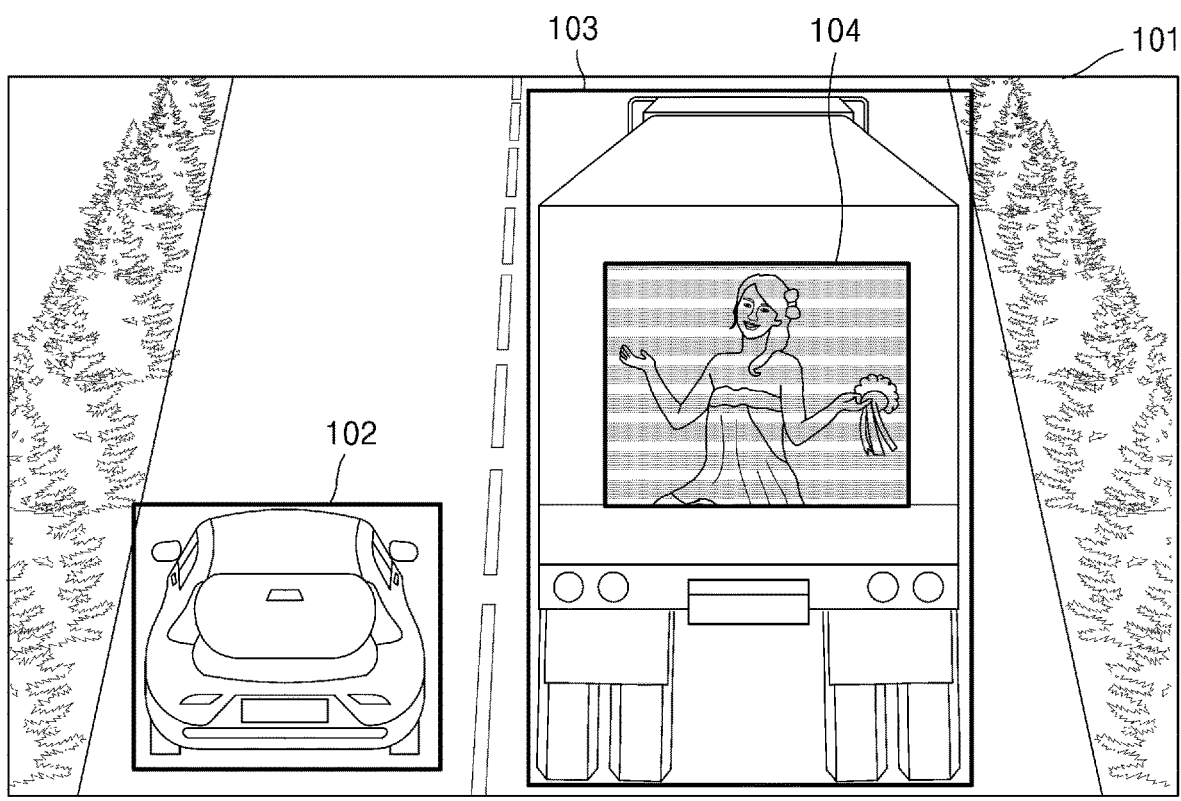
FIG. 7 illustrates the method of deciding a masking region, according to an embodiment.

FIG. 6 is a flowchart of a method of deciding a masking region, according to an embodiment. FIG. 7 illustrates a method of deciding a masking region, according to an embodiment. The flowchart of FIG. 6 will be described with reference to FIG. 7.

Referring to FIG. 6, in operation S601, the electronic apparatus 100 may determine that an object is not a real thing. In operation S602, the electronic apparatus 100 may decide or determine, as a masking region, the object determined not to be a real thing in a surrounding image.

According to an embodiment, the masking region may indicate a region occupied by an object determined not to be a real object in an image.

Referring to FIG. 7, the electronic apparatus 100 may decide or determine, as a masking region, a region of a bounding box including the person 104 determined not to be a real object in the surrounding image 101.

Referring back to FIG. 6, in operation S603, the electronic apparatus 100 may transmit information about the masking region to one or more modules configured to control a driving operation of a vehicle.

The one or more modules configured to control a driving operation of the vehicle may control a driving operation of the vehicle based on the information about the masking region.

For example, the one or more modules configured to control a driving operation of the vehicle may decide a driving operation of the vehicle by considering that the masking region is not a real object, but an image displayed on another real object. Alternatively, for example, the one or more modules configured to control a driving operation of the vehicle may decide a driving operation of the vehicle based on an image remaining by excluding the masking region from the surrounding image.

It is understood that FIGS. 6 and 7 are provided to describe an embodiment, and one or more other embodiments are not limited thereto.

Figure 8:
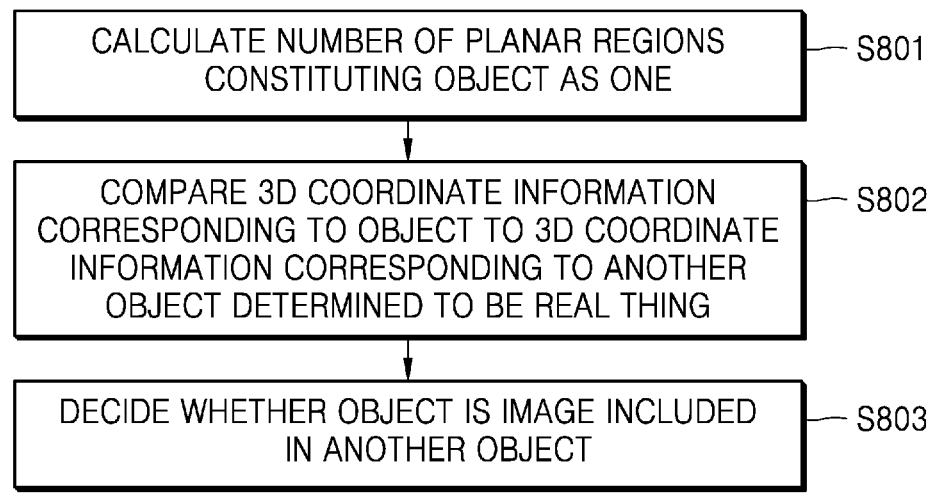
FIG. 8 is a flowchart of a method of determining whether an object is an image included in another object, according to an embodiment.
Figure 9:
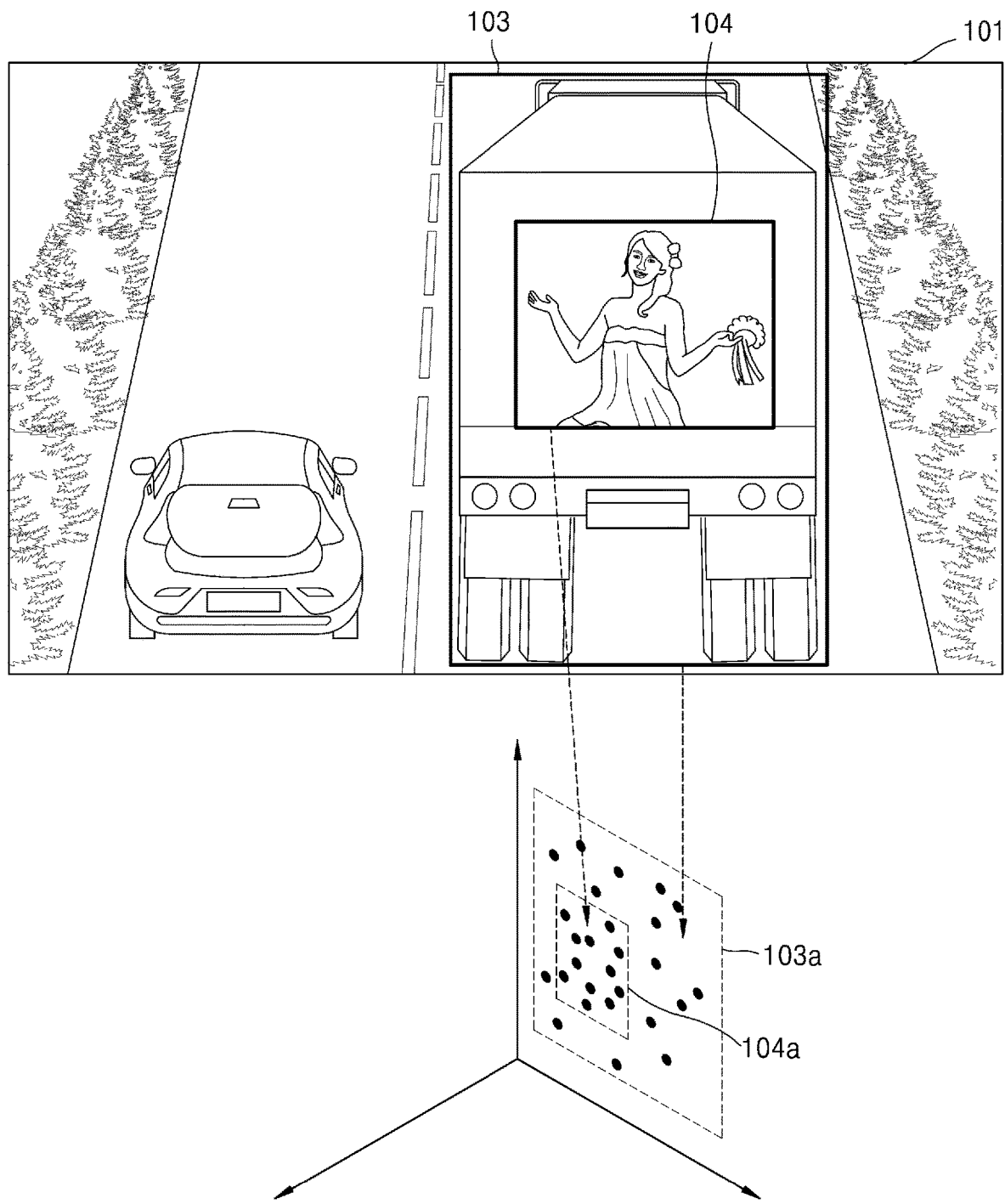
FIG. 9 illustrates the method of determining whether an object is an image included in another object, according to an embodiment.

FIG. 8 is a flowchart of a method of determining whether an object is an image included in another object, according to an embodiment. FIG. 9 illustrates a method of determining whether an object is an image included in another object, according to an embodiment. The flowchart of FIG. 8 will be described with reference to FIG. 9.

Referring to FIG. 8, In operation S801, the electronic apparatus 100 may calculate or determine that the number of planar regions constituting an object is one. As described above, the electronic apparatus 100 may determine that a recognized object is not a real thing when (e.g., based on) it is calculated or determined that the number of planar regions constituting the recognized object is one. According to another embodiment, the electronic apparatus 100 may determine that the recognized object is not a real thing based on a plurality of criteria, e.g., based on at least two of determining that the number of planar regions constituting the recognized object is one, determining that the object (or a bounding box for the object) is encompassed or enclosed within another object (or a bounding box for another object), determining that the object is on a same plane as another object that encompasses or enclosed the object, etc.

Referring to FIG. 9, for example, the electronic apparatus 100 may determine that the object (e.g., a human image) 104 is not a real thing when it is calculated that the object (e.g., a human image) 104 consists of one planar region, based on 3D coordinate information corresponding to the object (e.g., a human image) 104 in the surrounding image 101.

Referring back to FIG. 8, in operation S802, the electronic apparatus 100 may compare 3D coordinate information corresponding to the object to 3D coordinate information corresponding to another object determined to be a real thing. In operation S803, the electronic apparatus 100 may decide whether the object is an image included in another object.

Referring to FIG. 9, for example, the electronic apparatus 100 may compare the planar region 104a based on 3D coordinate information corresponding to the object (e.g., a human image) 104 determined not to be a real thing to the planar region 103a based on 3D coordinate information corresponding to the object (e.g., a truck) 103 determined to be a real thing. The electronic apparatus 100 may decide that the object (e.g., a human image) 104 is an image included in the other object (e.g., a truck) 103 when it is determined that the object (e.g., a human image) 104 is located on the same plane as the other object (e.g., a truck) 103.

It is understood that FIGS. 8 and 9 are provided to describe an embodiment, and one or more other embodiments are not limited thereto.

Figure 10:
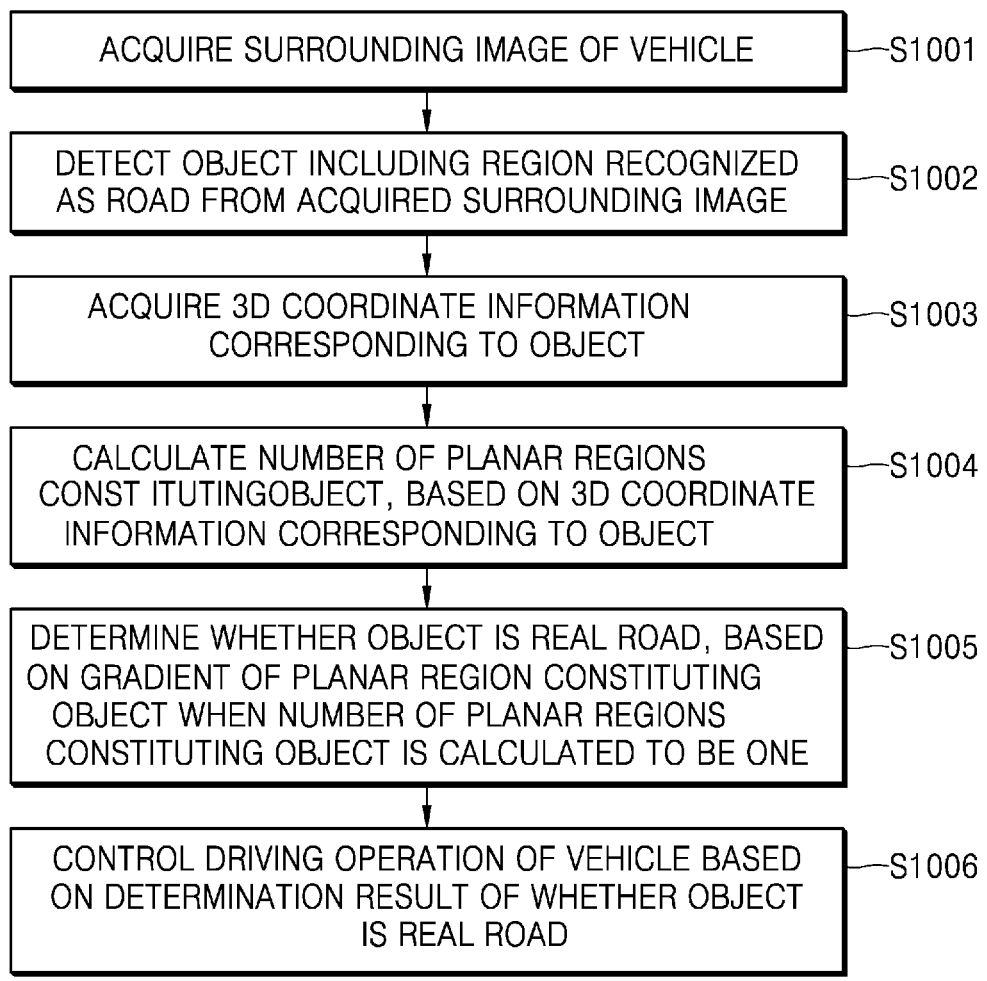
FIG. 10 is a flowchart of an operating method of an electronic apparatus, according to an embodiment.
Figure 11:
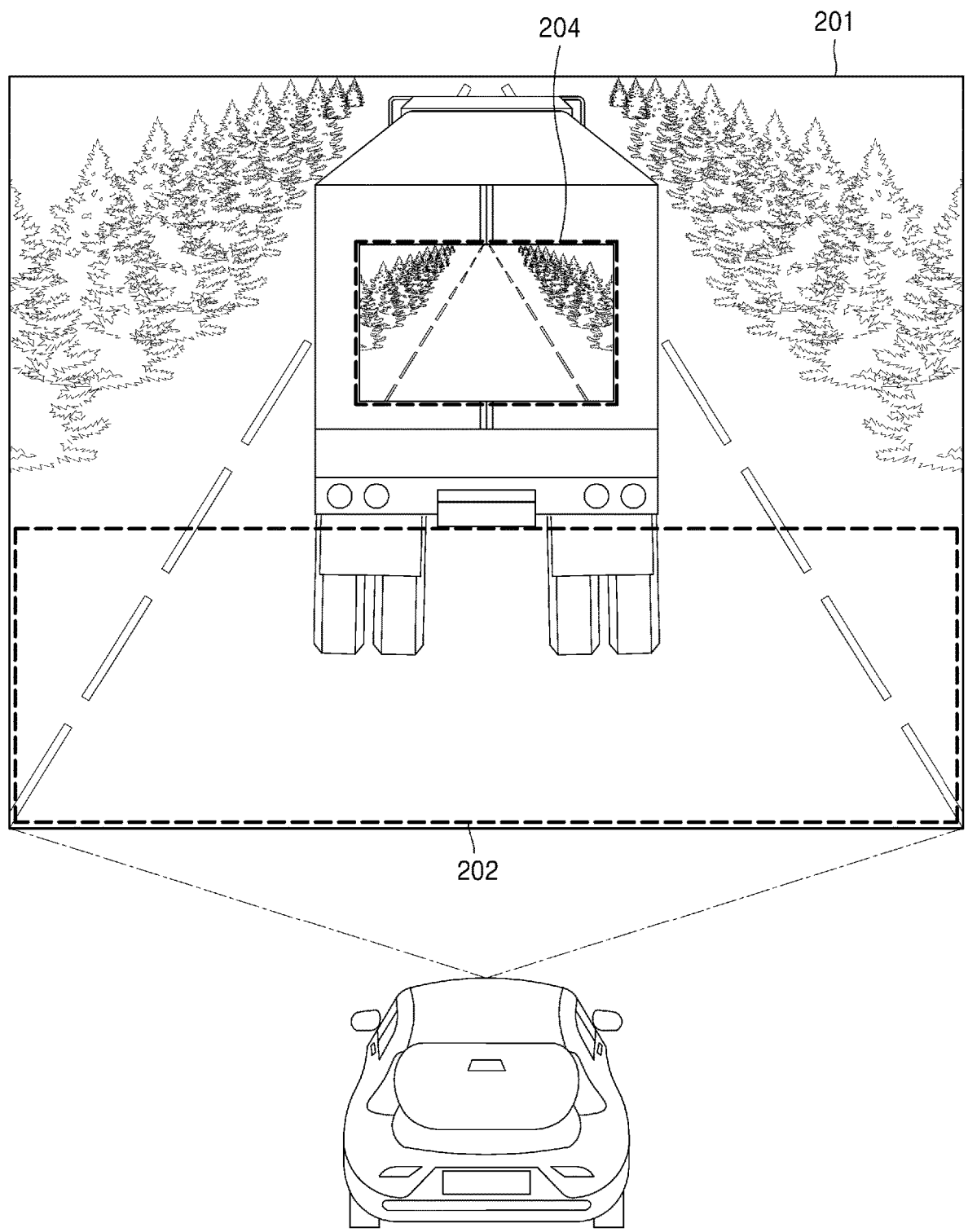
FIG. 11 illustrates an example of recognizing an object including a road region from an image, according to an embodiment.
Figure 12:
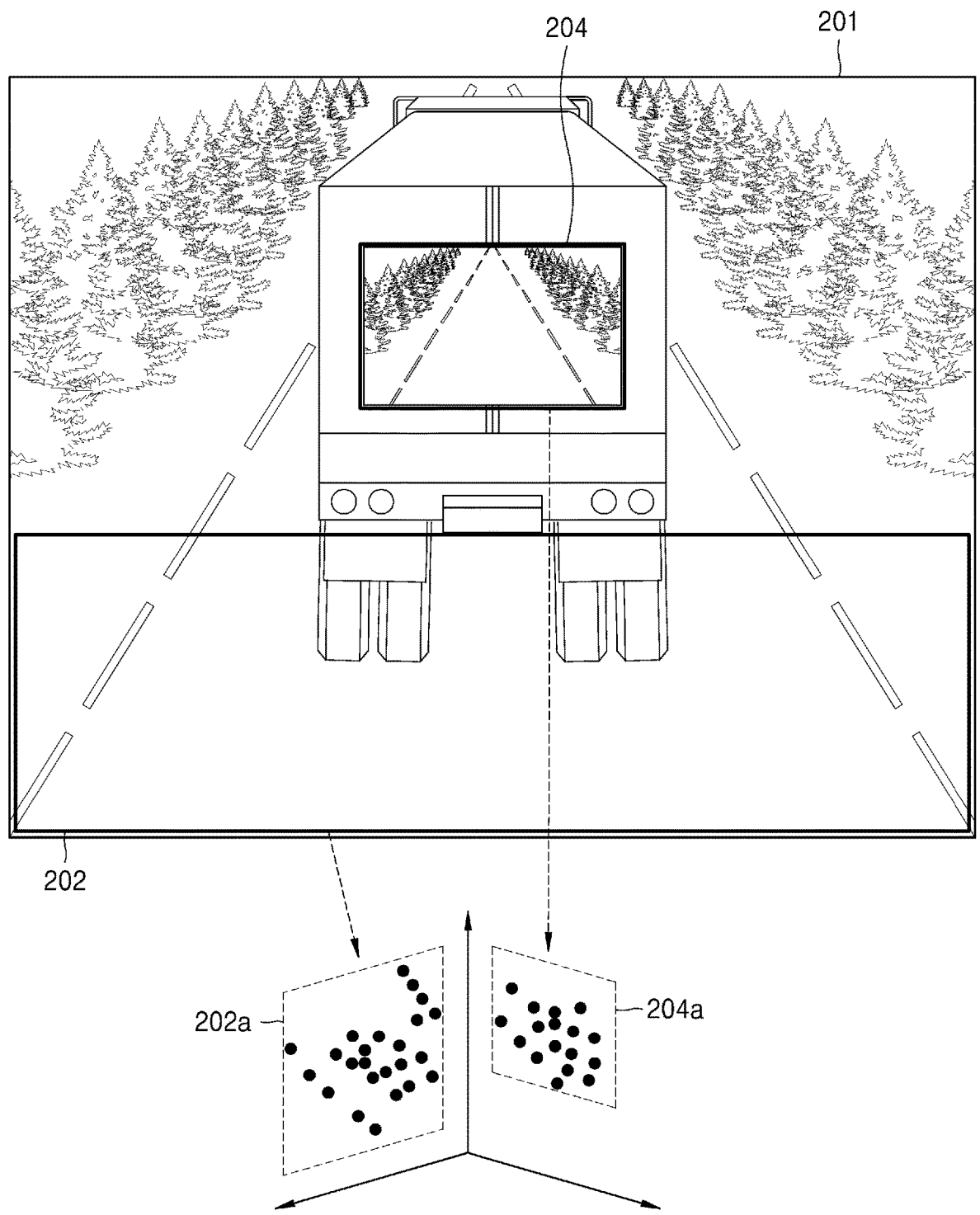
FIG. 12 illustrates a method of determining whether an object is a real road, according to an embodiment.

FIG. 10 is a flowchart of an operating method of an electronic apparatus 100, according to an embodiment. FIG. 11 illustrates an example of recognizing an object including a road region from an image, according to an embodiment. FIG. 12 illustrates a method of determining whether an object is a real road, according to an embodiment. The flowchart of FIG. 10 will be described with reference to FIGS. 11 and 12.

In the example shown in FIG. 11, a truck may include a screen on a rear surface of the truck. A real-time forward image of the truck may be displayed on the screen.

Referring to FIG. 10, in operation S1001, the electronic apparatus 100 may acquire a surrounding image of a vehicle. The acquiring of the surrounding image of the vehicle 1 by the electronic apparatus 100 according to an embodiment may be the same as or similar to the acquiring of the surrounding image described above with reference to operation S201 of FIG. 2.

In operation S1002, the electronic apparatus 100 may detect an object including a region recognized as a road from the acquired surrounding image.

According to an embodiment, the electronic apparatus 100 may recognize a road from an image acquired while the vehicle 1 is driving, by using an algorithm of detecting a road from an image. According to another embodiment, the road may be recognized from the acquired image using a machine learning model or neural network trained to recognize a road from an image.

Referring to FIG. 11, for example, the electronic apparatus 100 may detect a first object 202 including a region recognized as a road and a second object 204 including a region recognized as a road from a surrounding image 201.

Referring back to FIG. 10, in operation S1003, the electronic apparatus 100 may acquire 3D coordinate information corresponding to the object. The acquiring of the 3D coordinate information corresponding to the object by the electronic apparatus 100 according to an embodiment may be the same as or similar to the acquiring of the 3D coordinate information described above with reference to operation S203 of FIG. 2.

In operation S1004, the electronic apparatus 100 may calculate or determine a number of planar regions constituting the object based on the 3D coordinate information corresponding to the object. The calculating of the number of planar regions constituting the object by the electronic apparatus 100 according to an embodiment may be the same as or similar to the calculating described above with reference to operation S204 of FIG. 2.

As shown in FIGS. 11 and 12, the electronic apparatus 100 may acquire 3D coordinate information of the first object 202 by using the sensing module 110 (see FIG. 18) to sense the first object 202. The electronic apparatus 100 may calculate or determine how many planar regions constitute the first object 202, based on the 3D coordinate information corresponding to the first object 202.

In addition, the electronic apparatus 100 may acquire 3D coordinate information of the second object 204 by using the sensing module 110 (see FIG. 18) to sense the second object 204. The electronic apparatus 100 may calculate or determine how many planar regions constitute the second object 204, based on the 3D coordinate information corresponding to the second object 204.

In the example shown in FIGS. 11 and 12, the first object 202 recognized as a road is a real road, and it may be calculated or determined that the first object 202 consists of one planar region 202a. In addition, the second object 204 recognized as a road is an image displayed on a rear surface of a truck that is driving ahead of the vehicle 1, and it may be calculated or determined that the second object 204 consists of one planar region 204a.

Referring back to FIG. 10, in operation S1005, the electronic apparatus 100 may determine whether the object is a real road, based on a gradient of the planar region constituting the object when the number of planar regions constituting the object is calculated to be one.

In the example shown in FIGS. 11 and 12, the second object 204 is recognized as a road from the surrounding image 201 as described above, but the second object 204 is not a real road. Rather, the second object 204 is an image displayed on the rear surface of the truck that is driving ahead of the vehicle 1. Therefore, when (or based on) the electronic apparatus 100 detects the second object 204 through the sensing module 110 (see FIG. 18), it may be calculated or determined that a gradient of the planar region of the second object 204 differs by a preset threshold or more from that of the ground in a driving direction of the vehicle.

In addition, the electronic apparatus 100 may determine that the second object 204 is not a real road, through or based on at least one of comparison of an angle between the planar region constituting the second object 204 and a direction of gravity, a separation distance from the vehicle, a separation between the second object 204 and the real road, or the like.

In the example of FIGS. 11 and 12, the electronic apparatus 100 may determine that the first object 202 is a real road on which the vehicle 1 is driving, based on the 3D coordinate information corresponding to the first object 202.

Referring back to FIG. 10, in operation S1006, the electronic apparatus 100 may control a driving operation of the vehicle based on a result of the determining whether the object is a real road.

In the example of FIGS. 11 and 12, the electronic apparatus 100 may perform more accurate driving control of the vehicle 1 than before based on the fact that the second object 204 recognized from the surrounding image 201 is not a real road.

It is understood that FIGS. 10 to 12 are provided to describe an embodiment, and one or more other embodiments are not limited thereto.

Figure 13:
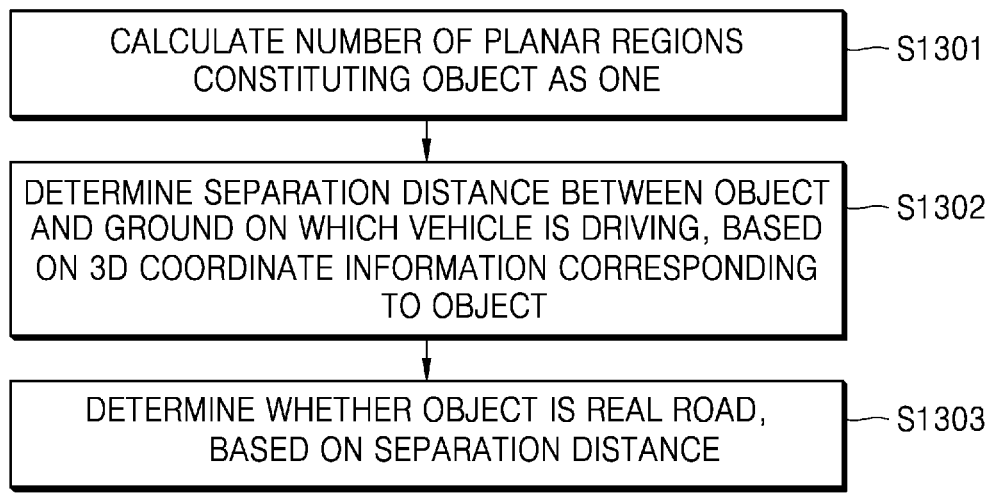
FIG. 13 is a flowchart of a method of determining whether an object is a real road, according to an embodiment.
Figure 14:
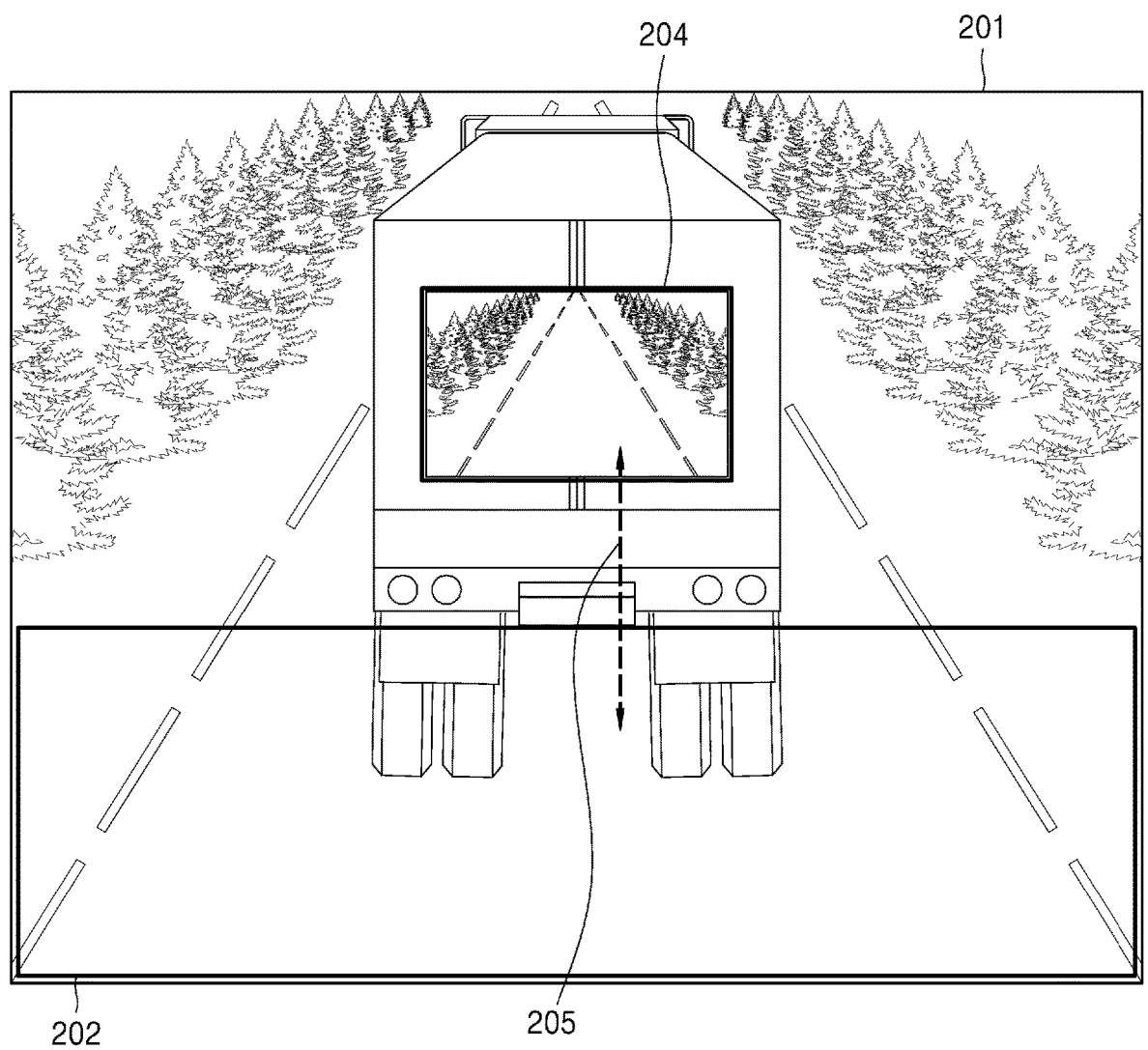
FIG. 14 illustrates the method of determining whether an object is a real road, according to an embodiment.

FIG. 13 is a flowchart of a method of determining whether an object is a real road, according to an embodiment. FIG. 14 illustrates a method of determining whether an object is a real road, according to an embodiment. The flowchart of FIG. 13 will be described with reference to FIG. 14.

Referring to FIG. 13, in operation S1301, the electronic apparatus 100 may calculate a number of planar regions constituting an object as one.

Referring to FIG. 14, for example, the electronic apparatus 100 may calculate the number of planar regions constituting the first object 202 as one. In addition, the electronic apparatus 100 may calculate the number of planar regions constituting the second object 204 as one.

In operation S1302, the electronic apparatus 100 may determine a separation distance between the object and the ground on which a vehicle 1 is driving, based on 3D coordinate information corresponding to the object.

Referring to FIG. 14, for example, the electronic apparatus 100 may determine a separation distance 205 between the second object 204 and the ground on which the vehicle 1 is driving, based on the 3D coordinate information corresponding to the second object 204.

Referring back to FIG. 13, in operation S1303, the electronic apparatus 100 may determine whether the object is a real road, based on the separation distance.

According to an embodiment, the electronic apparatus 100 may determine that the second object 204 is not a real road, based on the separation distance 205 between the second object 204 and the ground on which the vehicle 1 is driving. For example, when it is determined that the separation distance 205 between the second object 204 and the ground on which the vehicle 1 is driving is a preset threshold or more, the electronic apparatus 100 may determine that the second object 204 is not a real road. According to another embodiment, the electronic apparatus 100 may determine that the second object 204 is not a real road based on the existence of a separation between the second object 204 and the ground on which the vehicle 1 is driving.

It is understood that FIGS. 13 to 14 are provided to describe an embodiment, and one or more other embodiments are not limited thereto.

Figure 15:
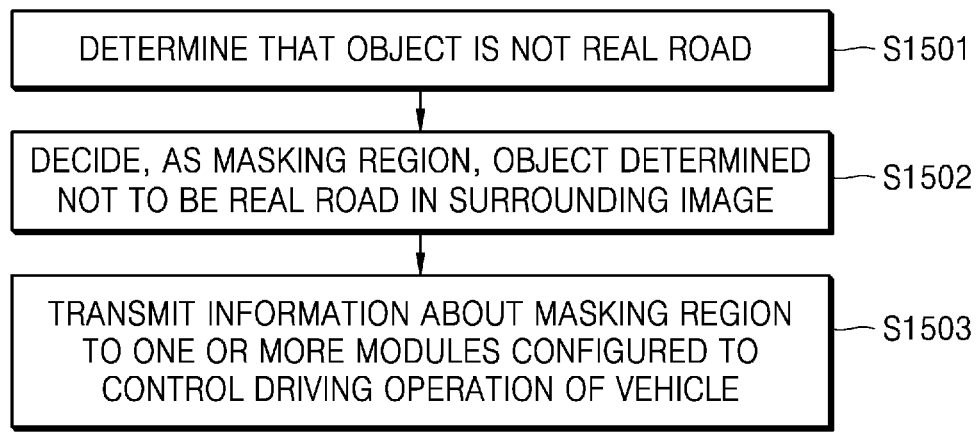
FIG. 15 is a flowchart of a method of deciding a masking region, according to an embodiment.
Figure 16:
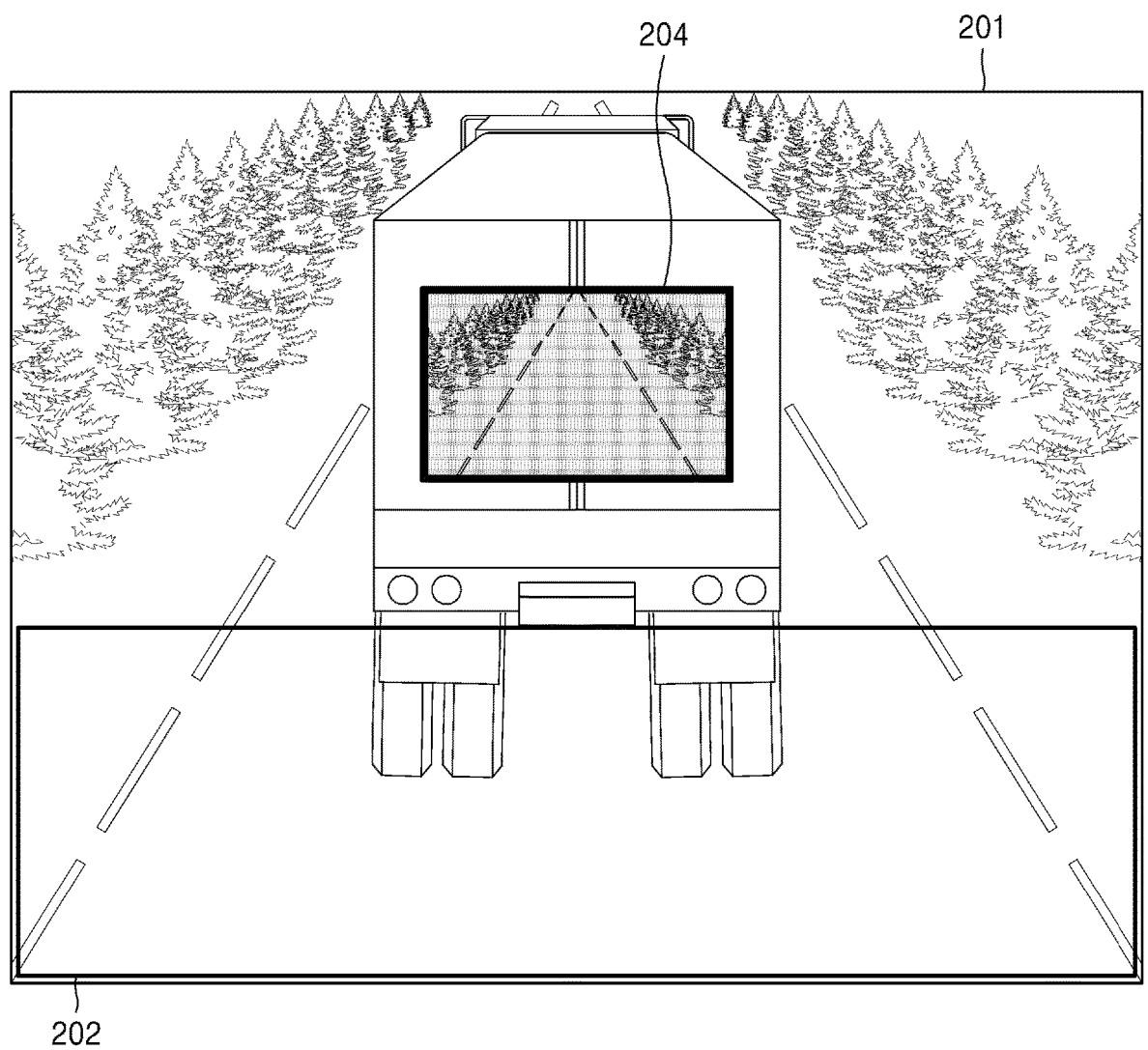
FIG. 16 illustrates the method of deciding a masking region, according to an embodiment.

FIG. 15 is a flowchart of a method of deciding a masking region, according to an embodiment. FIG. 16 illustrates a method of deciding a masking region, according to an embodiment. The flowchart of FIG. 15 will be described with reference to FIG. 16.

Referring to FIG. 15, in operation S1501, the electronic apparatus 100 may determine that an object is not a real road. In operation S1502, the electronic apparatus 100 may decide, as a masking region, the object determined not to be a real road in a surrounding image.

Referring to FIG. 16, according to an embodiment, the electronic apparatus 100 may determine that the second object 204 is not a real road and decide or determine, as a masking region, the second object 204 in the surrounding image 201.

Referring back to FIG. 15, in operation S1503, the electronic apparatus 100 may transmit information about the masking region to one or more modules configured to control a driving operation of a vehicle.

Referring to FIG. 16, according to an embodiment, the electronic apparatus 100 may control a driving operation of the vehicle 1 based on the fact (or the determination) that the second object 204 is a masking region.

For example, the one or more modules configured to control a driving operation of the vehicle may decide or control a driving operation of the vehicle by considering that the masking region is not a real object, but an image displayed on another real object. Alternatively, for example, the one or more modules configured to control a driving operation of the vehicle may decide or control a driving operation of the vehicle based on an image remaining by excluding the masking region from the surrounding image.

It is understood that FIGS. 15 and 16 are provided to describe an embodiment, and one or more other embodiments are not limited thereto.

Figure 17:
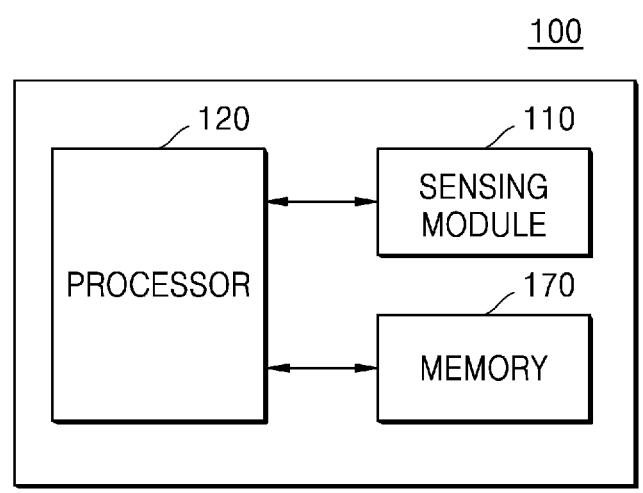
FIG. 17 is a block diagram of an electronic apparatus according to an embodiment.

FIG. 17 is a block diagram of an electronic apparatus 100 according to an embodiment.

Referring to FIG. 17, the electronic apparatus 100 may include the sensing module 110 (e.g., at least one sensor), a memory 170, and a processor 120. It is understood that the electronic apparatus 100 may include other components than those shown in FIG. 17.

The sensing module 110 may sense the surroundings of the vehicle 1 while the vehicle 1 is driving.

The sensing module 110 may include a plurality of sensors to sense the surroundings of the vehicle 1. For example, the sensing module 110 may include distance sensors, such as the LIDAR sensor 227 (see FIG. 18), the RADAR sensor 226 (see FIG. 18), and the image sensor 228 (see FIG. 18) such as a camera.

In addition, the sensing module 110 may include one or more actuators configured to correct positions and/or orientations of the plurality of sensors, and may therefore sense objects located in front, rear, and side directions of the vehicle 1.

According to an embodiment, the sensing module 110 may sense at least one of a size, a shape, a moving speed, and a moving direction of an object around the vehicle 1, a distance between the vehicle 1 and the object, and the like.

The processor 120 may include at least one processor.

The processor 120 may execute one or more instructions to acquire a surrounding image of the vehicle 1 by using or controlling the sensing module 110.

In addition, the processor 120 may execute one or more instructions to recognize at least one object from the acquired surrounding image.

Further, the processor 120 may execute one or more instructions to acquire or obtain 3D coordinate information for each recognized object by using or controlling at least one sensor.

The processor 120 may also execute one or more instructions to calculate or determine a number of planar regions constituting an object based on the 3D coordinate information corresponding to the object.

The processor 120 may execute one or more instructions to determine whether the object is a real thing, based on the number of planar regions constituting the object.

In addition, the processor 120 may execute one or more instructions to determine that the object is not a real thing when (or based on) the number of planar regions constituting the object is calculated or determined to be one.

As described above, the processor 120 may execute one or more instructions to control a driving operation of the vehicle 1 based on a result of the determining whether the object is a real thing.

Further, the processor 120 may execute one or more instructions to decide that an object determined not to be a real thing in a surrounding image is a masking region when (or based on) it is determined that the object is not a real thing, and to transmit information about the masking region to one or more modules configured to control a driving operation of the vehicle 1.

The processor 120 may execute one or more instructions to decide or determine whether an object is an image included in another object, based on a comparison between 3D coordinate information corresponding the object and 3D coordinate information corresponding to another object determined to be a real thing when (or based on) the number of planar regions constituting the object is calculated to be one.

According to another embodiment, the processor 120 may execute one or more instructions to acquire a surrounding image of the vehicle 1 by using or controlling at least one sensor.

In addition, the processor 120 may execute one or more instructions to detect an object including a region recognized as a road from the acquired surrounding image.

The processor 120 may execute one or more instructions to acquire 3D coordinate information corresponding to the object by using at least one sensor.

The processor 120 may execute one or more instructions to calculate or determine a number of planar regions constituting the object based on the 3D coordinate information corresponding to the object.

Further, the processor 120 may execute one or more instructions to determine whether the object is a real road, based on a gradient of the planar region constituting the object when (or based on) the number of planar regions constituting the object is calculated to be one In addition, the processor 120 may execute one or more instructions to determine a separation distance between the object and the ground on which the vehicle 1 is driving, based on the 3D coordinate information corresponding to the object, and to determine whether the object is a real road, based on the separation distance.

The processor 120 may also execute one or more instructions to control a driving operation of the vehicle 1 based on a result of the determining whether the object is a real road.

The processor 120 may execute one or more instructions to decide, as a masking region, the object determined not to be a real road in the surrounding image when (or based on) it is determined that the object is not a real road, and to transmit information of the masking region to one or more modules configured to control a driving operation of the vehicle 1.

FIG. 18 is a detailed block diagram of an electronic apparatus 100 according to an embodiment.

Referring to FIG. 18, the electronic apparatus 100 may include the sensing module 110 (e.g., at least one sensor), the processor 120, an outputter 130, a storage 140, an inputter 150, and a communication interface 160.

The sensing module 110 may include a plurality of sensors configured to sense information about a surrounding environment where the vehicle 1 is located and include one or more actuators configured to correct positions and/or orientations of the plurality of sensors. For example, the sensing module 110 may include at least one of a global positioning system (GPS) 224, an inertial measurement unit (IMU) 225, the RADAR sensor 226, the LIDAR sensor 227, the image sensor 228, and an odometry sensor 230. In addition, the sensing module 110 may include at least one of a temperature/humidity sensor 232, an infrared sensor 233, an atmospheric pressure sensor 235, a proximity sensor 236, and an RGB (illuminance) sensor 237, but is not limited thereto. A function of each sensor may be intuitively inferred by those of ordinary skill in the art from a name thereof.

In addition, the sensing module 110 may include a motion sensor 238 capable of sensing a motion of the vehicle 1. The motion sensor 238 may include a magnetic sensor 229, an acceleration sensor 231, and a gyroscope sensor 234.

The GPS 224 may be configured to estimate a geographical position of the vehicle 1. That is, the GPS 224 may include a transceiver configured to estimate a position of the vehicle 1 on the Earth.

The IMU 225 may be a set of sensors configured to detect changes in a position and an orientation of the vehicle 1 based on an inertial acceleration. For example, the set of sensors may include accelerometers and gyroscopes.

The RADAR sensor 226 may be configured to detect objects in an environment where the vehicle 1 is located, by using a radio signal. In addition, the RADAR sensor 226 may be configured to detect speeds and/or directions of the objects.

The LIDAR sensor 227 may be configured to detect objects in an environment where the vehicle 1 is located, by using a laser. More particularly, the LIDAR sensor 227 may include a laser light source and/or a laser scanner configured to emit a laser beam and a detector configured to detect reflection of the laser beam. The LIDAR sensor 227 may be configured to operate in a coherent (e.g., using heterodyne detection) or incoherent detection mode.

The image sensor 228 may be a still camera or a video camera configured to record an environment outside the vehicle 1. For example, the image sensor 228 may include a plurality of cameras, and the plurality of cameras may be arranged at a plurality of positions inside and/or outside the vehicle 1.

The odometry sensor 230 may estimate a position of the vehicle 1 and measure a moved distance of the vehicle 1. For example, the odometry sensor 230 may measure a position change value of the vehicle 1 by using the number of revolutions of a wheel of the vehicle 1.

The storage 140 may include at least one of a magnetic disc drive, an optical disc drive, and a flash memory. Alternatively (or additionally), the storage 140 may be a portable universal serial bus (USB) data storage device. The storage 140 may store system software for executing or implementing embodiments. The system software may be stored in a portable storage medium.

The communication interface 160 may include at least one antenna for communicating with another device in a wireless manner. For example, the communication interface 160 may be used to communicate with a cellular network or another wireless protocol and system in a wireless manner through Wi-Fi or Bluetooth. The communication interface 160 controlled by the processor 120 may transmit and receive a wireless signal. For example, the processor 120 may execute a program stored in the storage 140, such that the communication interface 160 transmits and receives a wireless signal to and from a cellular network.

The inputter 150 indicates a means or device for inputting data for controlling the vehicle 1. For example, the inputter 150 may include at least one of a key pad, a dome switch, a touch pad (a capacitive overlay touch pad, a resistive overlay touch pad, an infrared (IR) beam touch pad, a surface acoustic wave touch pad, an integral strain gauge touch pad, a piezoelectric touch pad, or the like), a jog wheel, a jog switch, and the like, but is not limited thereto. In addition, the inputter 150 may include a microphone, wherein the microphone may be configured to receive audio (e.g., a voice command) from a passenger of the vehicle 1.

The outputter 130 may output at least one of an audio signal and a video signal, and the outputter 130 may include at least one of a display 281 and an acoustic outputter 282.

The display 281 may include at least one of a liquid crystal display, a thin film transistor-liquid crystal display, an organic light-emitting diode display, a flexible display, a 3D display, or an electrophoretic display. According to an implementation form of the outputter 130, the outputter 130 may include two or more displays 281.

The acoustic outputter 282 outputs audio data received from the communication interface 160 or stored in the storage 140. In addition, the acoustic outputter 282 may include a speaker, a buzzer, and the like.

The inputter 150 and the outputter 130 may include a network interface and may be implemented by a touch screen.

The processor 120 may generally control the sensing module 110, the communication interface 160, the inputter 150, the storage 140, and the outputter 130 by executing programs and/or instructions stored in the storage 140.

Figure 19:
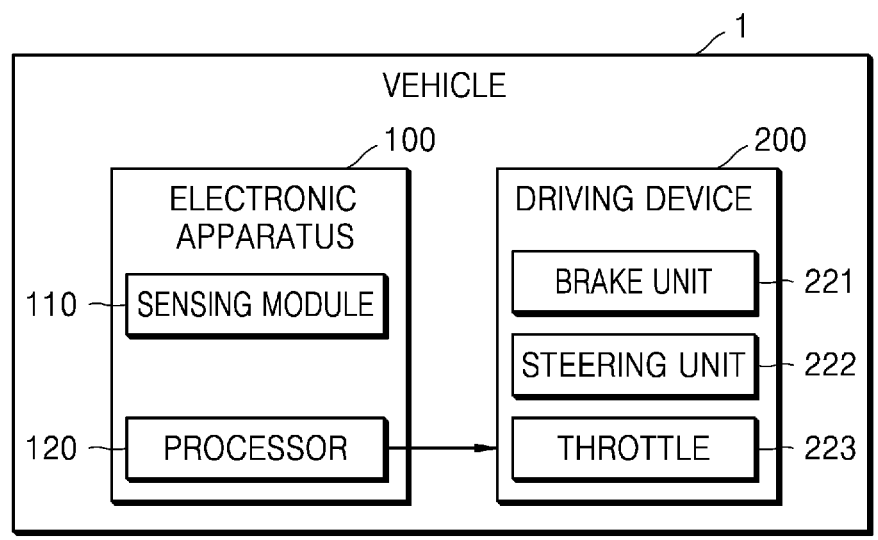
FIG. 19 is a block diagram of a vehicle according to an embodiment.

FIG. 19 is a block diagram of a vehicle 1 according to an embodiment.

The vehicle 1 may include the electronic apparatus 100 and a driving device 200 according to embodiments. The vehicle 1 shown in FIG. 19 includes components related to the present embodiment. It is understood that the vehicle 1 may include other components in addition to those shown in FIG. 19.

The electronic apparatus 100 may include a sensing module 110 and a processor 120.

The sensing module 110 and the processor 120 are the same as or similar to those described above with reference to FIGS. 17 and 18.

The driving device 200 may include a brake unit 221, a steering unit 222, and a throttle 223.

The steering unit 222 (e.g., steering wheel and mechanical components to adjust a direction of wheels) may be a set of mechanisms configured to adjust a direction of the vehicle 1.

The throttle 223 may be a set of mechanisms configured to control a speed of the vehicle 1 by controlling an operating speed of an engine/motor. In addition, the throttle 223 may adjust a throttle open rate to adjust a mixed gas volume of fuel air flowing in the engine/motor and may adjust a throttle open rate to adjust motive power and thrust.

The brake unit 221 (e.g., one or more brakes) may be a set of mechanisms configured to decelerate the vehicle 1. For example, the brake unit 221 may use friction to reduce a speed of a wheel/tire.

A device according to one or more embodiments may include a processor, a memory storing and executing program data, a permanent storage such as a disc drive, a communication port for communicating with an external device, a user interface device such as a touch panel, a key, a button, and the like, and the like. Methods implemented by a software module or algorithm may be stored in a non-transitory computer-readable recording medium as computer-readable code or program commands executable in the processor. Herein, examples of the non-transitory computer-readable recording medium include magnetic storage media (e.g., read-only memory (ROM), random-access memory (RAM), floppy disks, hard disks, etc.) and optical recording media (e.g., CD-ROMs, or digital versatile discs (DVDs)), and the like. The non-transitory computer-readable recording medium can also be distributed over network-coupled computer systems so that the computer-readable code is stored and executed in a distributed fashion. The medium is readable by a computer, is stored in a memory, and can be executed by a processor.

The present embodiments can be represented with functional blocks and various processing steps. These functional blocks can be implemented by various numbers of hardware and/or software configurations for executing specific functions. For example, one or more embodiments may adopt direct circuit configurations, such as memory, processing, logic, and look-up table, for executing various functions under control of one or more processors or by other control devices. Like components of the present embodiments being able to execute the various functions with software programming or software elements, the present embodiments can be implemented by a programming or scripting language, such as C, C++, Java, or assembler, with various algorithms implemented by a combination of a data structure, processes, routines, and/or other programming components. Functional aspects can be implemented with algorithms executed in one or more processors. In addition, the present embodiments of the disclosure may adopt the prior art for electronic environment setup, signal processing and/or data processing. The terms, such as "mechanism," "element," "means," and "configuration," can be widely used and are not delimited as mechanical and physical configurations. The terms may include the meaning of a series of routines of software in association with a processor.

Specific executions described in the disclosure are illustrative and do not limit the scope of the disclosure.

The aforementioned embodiments of the disclosure are only illustrative, and it will be understood by those of ordinary skill in the art that various changes in form and details may be made therein without changing the technical spirit and mandatory features of the disclosure. Therefore, the aforementioned embodiments of the disclosure should be understood in the illustrative sense only and not for the purpose of limitation in all aspects. For example, each component described as a single type may be carried out by being distributed, and likewise, components described as a distributed type may also be carried out by being coupled.

The use of all illustrations or illustrative terms in the disclosure is simply to describe the disclosure in detail, and the scope of the disclosure is not limited due to the illustrations or illustrative terms unless they are limited by claims.

In addition, when there is no concrete use of terms such as "requisite" or "important" to refer to a component, that component may not be necessarily required in all embodiments.

It will be understood by those of ordinary skill in the art to which the embodiments of the disclosure belong that various changes in form and details may be made therein without departing from essential features of the disclosure.

It is understood that the disclosure is not limited to a specific embodiment but includes every modification, equivalent, and replacement within the spirit and technical scope of the disclosure. Therefore, the embodiments of the disclosure should be considered in descriptive sense only and not for purposes of limitation.

The scope of claims is defined not by the detailed description but by the appended claims, and it should be understood that the meaning and scope of the claims and all changed or modified forms derived from the equivalent concept of the claims are included in the scope of the disclosure.

Terms such as " . . . unit", " . . . module", and the like used in the specification refer to units that perform at least one function or operation, and the units may be implemented as hardware or software or as a combination of hardware and software.

The "unit" and "module" may be implemented by a program stored in an addressable storage medium and executable by a processor.

For example, the "unit" and "module" may be implemented by components, such as software components, object-oriented software components, class components, and task components, processes, functions, attributes, procedures, subroutines, segments of program code, drivers,

What is claimed is:

1. An electronic apparatus for assisting with driving of a vehicle, the electronic apparatus comprising:
at least one sensor;
a memory storing one or more instructions; and
a processor configured to execute the one or more instructions stored in the memory to:
obtain a surrounding image of the vehicle via the at least one sensor,
determine an object from the obtained surrounding image,
obtain three-dimensional (3D) coordinate information for the determined object,
determine a number of planar regions constituting the object, based on the 3D coordinate information corresponding to the object,
determine that the object is not a real object, based on the determined number of planar regions constituting the object,
determine that the object is included in a second object determined to be a real object based on a comparison between the 3D coordinate information corresponding to the object and 3D coordinate information corresponding to the second object determined to be the real object, and
control a driving operation of the vehicle based on a result of the determining that the object is included in the second object.

2. The electronic apparatus of claim 1, wherein the processor is further configured to execute the one or more instructions to determine that the object is not the real object based on the determined number of planar regions constituting the object being one.

3. The electronic apparatus of claim 1, wherein the processor is further configured to execute the one or more instructions to, based on the object determined to not be the real object:
determine, as a masking region, the object in the surrounding image; and
transmit information about the masking region to one or more modules configured to control the driving operation of the vehicle.

4. The electronic apparatus of claim 1, wherein the processor is further configured to execute the one or more instructions to, based on the determined number of planar regions constituting the object being one, determine that the object is an image included in the second object.

5. The electronic apparatus of claim 4, wherein the processor is further configured to execute the one or more instructions to, based on the determined number of planar regions constituting the object being one, determine that the object is the image included in the second object.

6. A method of assisting with driving of a vehicle, the method comprising:
obtaining a surrounding image of the vehicle;
determining an object from the obtained surrounding image;
obtaining three-dimensional (3D) coordinate information for the determined object;
determining a number of planar regions constituting the object, based on the 3D coordinate information corresponding to the object;
determining that the object is not a real object, based on the determined number of planar regions constituting the object;
determining that the object is included in a second object determined to be a real object based on a comparison between the 3D coordinate information corresponding to the object and 3D coordinate information corresponding to the second object determined to be the real object; and
controlling a driving operation of the vehicle based on a result of the determining that the object is included in the second object.

7. The method of claim 6, wherein the determining of whether the object is the real object comprises determining that the object is not the real object based on the determined number of planar regions constituting the object being one.

8. The method of claim 6, wherein the controlling of the driving operation of the vehicle comprises, based on the object determined to not be the real object:
determining, as a masking region, the object in the surrounding image; and
transmitting information about the masking region to one or more modules configured to control the driving operation of the vehicle.

9. The method of claim 6, further comprising, based on the determined number of planar regions constituting the object being one, determining that the object is an image included in the second object.

10. The method of claim 9, further comprising, based on the determined number of planar regions constituting the object being one, determining that the object is the image included in the second object.

11. A non-transitory computer-readable recording medium having recorded thereon a program for executing, in a computer, the method of claim 6.

* * * * *